United States Patent Office 2,710,854
Patented June 14, 1955

2,710,854

ETHYLENE POLYMERIZATION WITH CATALYST COMPOSED OF A GROUP VIa METAL OXIDE AND AN ALKALINE EARTH CARBIDE

Herman S. Seelig, Valparaiso, Ind., assignor to Standard Oil Company, Chicago, Ill., a corporation of Indiana No Drawing. Application December 6, 1952,
Serial No. 324,606

22 Claims. (Cl. 260—94.9)

This invention relates to a novel polymerization process and particularly to a novel process for the polymerization of ethylene in the presence of certain metal carbides and a solid material containing an oxide of a metal of group 6a (left hand subgroup of group 6) of the Mendeleef Periodic Table, viz. one or more of the oxides of Cr, Mo, W or U.

One object of my invention is to provide novel and highly useful catalysts and, especially, catalyst promoters for the preparation of high molecular weight polymers from ethylene-containing gas mixtures. Another object is to provide a process of ethylene polymerization in which the yields of solid polymer are greatly increased, as compared with the yields heretofore obtainable solely by the use of subhexavalent oxides of group 6a metals. Another object is to provide a novel process for the polymerization of ethylene to high molecular weight normally solid polymers, including resinous or plastic materials. A further object is to provide a relatively low temperature, low pressure process for the conversion of ethylene-containing gases to high molecular weight resinous or plastic materials. These and other objects of my invention will become apparent from the ensuing description thereof.

Briefly, the inventive process comprises the conversion of ethylene principally to high molecular weight, normally solid polymers by contact with $CaC_2$, $SrC_2$ or $BaC_2$ and a catalyst comprising one or more of the oxides of chromium, molybdenum, tungsten or uranium, for example, a partially reduced molybdenum trioxide extended upon a support. The inventive process is effected at temperatures between about 100° C. and about 350° C., more often between about 200° C. and 300° C., preferably between about 230° C. and about 280° C. The reaction pressures can be varied between about atmospheric and 15,000 p. s. i. g. or higher, preferably between about 200 and 5000, or about 1000 p. s. i. g. The normally solid materials produced by the catalytic conversion tend to accumulate upon and within the solid catalyst. It is desirable to supply to the reaction zone a liquid medium which serves both as a reaction medium and a solvent for the solid reaction products. Suitable liquid reaction media include various hydrocarbons, particularly an aromatic hydrocarbon such as benzene, toluene, or xylenes. However, the conversion of ethylene-containing gas streams can be effected in the absence of a liquid reaction medium or solvent and the catalyst containing accumulated solid polymeric conversion products can be treated from time to time, within or outside the conversion zone, to effect removal of conversion products therefrom and, if necessary, reactivation or regeneration of the catalyst for further use.

The practice of the present process can lead to grease-like ethylene homopolymers having an approximate molecular weight range of 300 to 700, wax-like ethylene homopolymers having an approximate specific viscosity ($\times 10^5$) between about 1000 and 10,000 and tough, resinous ethylene homopolymers having an approximate specific viscosity ($\times 10^5$) of 10,000 to more than 300,000 [($\eta$relative$-1$)$\times 10^5$]. By the term "tough, resinous polyethylene" as used in the present specification and claims, I mean polymer having a brittle point below $-50°$ C. (A. S. T. M. Method D746–51T), impact strength greater than two foot pounds per inch of notch (A. S. T. M. Method D256–47T—Izod machine) and minimum elongation at room temperature (25° C.) of 100%.

The process of the present invention can be employed to effect the copolymerization of ethylene with other polymerizable materials and particularly with propylene. Other polymerizable materials such as n-butylenes, isobutylene, t-butylethylene, perfluoroethylene, 3,3,3-trifluoro-1-propene, perfluorobutadiene, acetylene, isoprene, etc., may be charged with ethylene to the polymerization zone, usually in proportions between about 1 and about 25% by volume, based on the volume of ethylene.

The employment of calcium carbide or its equivalents in the reaction zone has numerous important practical consequences, as compared to processes wherein said metal oxide catalysts are employed alone. Thus, in the presence of both calcium carbide and metal oxide catalyst, high yields of solid polymers can be obtained from ethylene, the metal oxide catalyst can function well in the presence of large proportions of liquid reaction medium, the metal oxide catalyst retains strong polymerization activity for a long period of time (long catalyst life), polymers having desirable ranges of physical and chemical properties can be readily produced by controlling the reaction variables, etc., as will appear from the detailed description and operating examples which follow.

The function or functions of the carbide in my process are not well understood. Thus, calcium carbide alone is not a catalyst for the polymerization of ethylene under the conditions described herein. Yet, calcium carbide co-functions somehow with the group 6a metal oxide catalysts to increase the productivity (polymer yield) of said catalysts, sometimes prodigiously.

Ethylene can be converted to normally solid polymers by contacting it with the metal carbide and a catalyst in which the group 6a metal is initially present as a trioxide rather than as a subhexavalent group 6a metal oxide, which is essential when no metal carbide is employed in the reaction zone.

The group 6a metal oxide catalysts can be extended or supported upon difficultly reducible metal oxides, e. g., upon alumina, titania, zirconia, on silica supports such as silica gel, kieselguhr, diatomite and the like; upon silica-alumina, aluminosilicates, such as various clays and bleaching earths; and even upon adsorptive carbon, which is however, not preferred.

The proportion of metal carbide employed can be varied from about 0.1 to about 10 parts by weight per part by weight of the metal oxide catalyst (total weight of solid catalyst); the preferred metal carbide:metal oxide catalyst weight ratio is between about 0.5 and about 5. The optimum proportions can readily be determined in specific instances, by simple small-scale tests with the specific feed stocks, liquid reaction medium, reaction medium:catalyst ratio, catalyst, temperature, pressure and nature of the product which is desired. Usually the metal carbide is employed in proportions between about 1 and about 5 parts by weight per part by weight of molybdena catalyst at ratios of liquid reaction medium:catalyst between about 5 and about 3000 volumes or more of liquid medium per part by weight of catalyst.

The metal carbide can be utilized in one of several ways in prolonging the life of the supported metal oxide catalyst. Thus the metal carbide may be pelleted with the supported metal oxide catalyst either before or after conditioning by reduction of the metal oxide catalyst as described hereinbelow. The metal carbide may be introduced to the reaction zone as a separate component, that is less intimately associated with the catalyst than is obtained by the use of discrete pellets comprising supported catalyst and metal carbide. When the oxide catalyst is introduced separately, conditioning and reduction is accomplished either before or after the addition of the metal carbide. The metal carbide can also be used advantageously as a contact desiccant and/or promoter in preparing the feed and liquid medium for the polymerization reaction.

The relative proportions of support to the catalytic metal oxide is not critical and may be varied throughout a relatively wide range such that each is present in amounts of at least approximately 1 weight percent. The usual metal oxide-support ratios are in the range of about 1:20 to 1:1, or approximately 1:10. I can employ conditioned alumina-metal oxide catalysts composed of gamma-alumina base containing about 1 to 50%, preferably about 5 to 35%, or approximately 10%, of metal oxide supported thereon.

Gamma-alumina, titania and zirconia supports for my catalysts may be prepared in any known manner and the oxides of molybdenum or other group 6a metal may likewise be incorporated in, or deposited on, the support in any known manner, e. g. as described in copending Serial No. 233,641, now U. S. Pat. No. 2,692,257, of Alex Zletz, and Serial No. 223,643, now U. S. Pat. No. 2,692,258, of Alan K. Roebuck and Alex Zletz, both filed on April 28, 1951. I may employ group 6a hydroforming catalysts, the word "hydroforming" being employed to mean processes of the type described in United States Letters Patents 2,320,147, 2,388,536, 2,357,332, etc.

The molybdena or other molybdenum-oxygen compound may be present as a salt such as cobalt molybdate, which may be incorporated in the catalyst base in any known manner, e. g. by impregnation, coprecipitation, co-gelling, and/or absorption, and the catalyst base and/or finished catalyst may be heat stabilized by methods heretofore employed in the preparation of hydroforming or hydrofining catalysts. Cobalt molybdate catalysts may be prepared as described in U. S. 2,393,288, 2,486,361, etc. Cobalt, calcium, nickel and copper salts of chromic, tungstic and uranic acids may also be employed, with or without a support.

The catalyst may be stabilized with silica (U. S. 2,437,532-3) or with alumina ortho-phosphate (U. S. 2,440,236 and 2,441,297) or other known stabilizers or modifiers. The catalyst may contain calcium oxide (U. S. 2,422,172 and 2,447,043) or the base may be in the form of a zinc aluminate spinel (U. S. 2,447,016) and it may contain appreciable amounts of zirconia or titania (U. S. 2,437,531-2). Oxides of other metals such as magnesium, nickel, zinc, vanadium, thorium, iron, etc., may be present in minor amounts, below 10 weight per cent of the total catalyst.

Although, as stated above, no reducing treatment need be effected on the metal oxide catalysts when they are employed in the presence of the metal carbides, a reducing or conditioning treatment is preferred in commercial processing. The conditioning or reducing treatment of the hexavalent group 6a metal oxide is preferably effected with hydrogen although other reducing agents such as carbon monoxide, mixtures of hydrogen and carbon monoxide (water gas, synthesis gas, etc.), sulfur dioxide, hydrogen sulfide, dehydrogenatable hydrocarbons, etc., may be employed. Hydrogen can be employed as a reducing agent at temperatures between about 350° C. and about 850° C., although it is more often employed at temperatures within the range of 450° C. to 650° C. The hydrogen partial pressure in the reduction or conditioning operation may be varied from subatmospheric pressures, for example even 0.1 pound (absolute) to relatively high pressures up to 3000 p. s. i. g., or even more. The simplest reducing operations may be effected with hydrogen at about atmospheric pressure.

The partial reduction of the metal oxide catalyst in which the metal is present in its hexavalent state can be effected in the presence of the carbide promoter, prior to contacting the combination of catalysts with ethylene. An induction period, which sometimes occurs before ethylene polymerization starts, can be eliminated or substantially reduced by pressuring hydrogen into the reactor containing the solvent, ethylene, metal oxide catalyst and metal carbide, e. g. at hydrogen pressures between about 10 and about 900 p. s. i. g., preferably 100–400 p. s. i. g.; under these conditions a small proportion of the ethylene is reduced to ethane.

Lithium aluminum hydride, an exceptionally active reducing agent, conditions and activates catalysts containing hexavalent group 6a metal oxides even at temperatures as low as 35° C., although in general temperatures between about 100 and about 300° C. can be employed. In practice, for example, a catalyst containing free or chemically combined $MoO_3$ (e. g., combined as in $CoMoO_4$) is treated with a suspension of $LiAlH_4$ in a liquid hydrocarbon at weight ratios of about 0.2 to about 1 $LiAlH_4$ per weight of solid catalyst. Sodium hydride (or sodium plus $H_2$) is effective in reducing and conditioning hexavalent group 6a metal oxide catalysts such as $MoO_3$ at temperatures above about 180° C. and can be employed in the same proportions as $LiAlH_4$.

The conditioning and reducing treatment of the group 6a metal oxide (in the absence of the metal carbide promoter) can be followed and controlled by analysis with ceric sulfate-sulfuric acid solution, by means of which the average valence state of the molybdenum or other metal oxide in the catalyst can be accurately determined. To determine the average valence state of metals such as molybdenum in catalysts such as partially reduced $MoO_3$ supported on difficultly reducible metal oxides such as gamma-alumina, it is necessary to know the total molybdenum content and the number of milliequivalents of a standard oxidation reagent required to reoxidize the partially reduced molybdena to $MoO_3$. A suitable oxidation procedure consists of weighing out approximately one gram of finely-ground, freshly-reduced catalyst into a glass-stoppered 250-ml. Erlenmeyer flask and adding 25 ml. of 0.1 N ceric sulfate solution and 25 ml. of 1:1 sulfuric acid. This mixture is allowed to stand at room temperature for four days with frequent agitation. This interval was arbitrarily chosen initially but was later shown to be more than sufficient time for the oxidation to take place. The solid residue is then filtered off and the excess ceric solution determined by addition of excess standard ferrous solution which is in turn titrated with standard ceric solution using ferrous-orthophenanthroline as the indicator. Total molybdenum in the sample is determined by dissolving the sample in a sulfuric acid-phosphoric acid solution, reducing the molybdenum in a Jones reductor, catching the reduced solution in ferric alum, and titrating the resulting ferrous ion with standard ceric sulfate solution. From the values obtained, the oxidation state of molybdenum can be determined.

The partial reduction of the group 6a metal trioxide is carried out to the extent that the average valence state of the metal in the finished catalyst lies within the range of about 2 to about 5.5, preferably between about 3 and about 5.

The polymer formed in the polymerization reaction must be continuously or intermittently removed from the catalyst particles, preferably by means of solvents, and it is usually necessary or desirable to condition a catalyst surface which has been thus freed to some extent from polymer before it is again employed for effecting polymerization When catalyst can no longer be rendered sufficiently active by simple removal of polymer and conditioning with a reducing gas as hereinabove described, it may be regenerated by extraction with water, ammonium salts or dilute aqueous acids, thereafter burning combustible deposits therefrom with oxygen followed by the steps of metal carbide incorporation and conditioning as described hereinabove. Detoxification of the catalysts by treatment with dilute aqueous solutions of per-acids such as permolybdic, pervanadic or pertungstic acids may be practiced, followed by hydrogen-conditioning of the catalysts and incorporation of metal carbide promoter.

The catalysts can be employed in various forms and sizes, e. g., as powder, granules, microspheres, broken filter cake, lumps, or shaped pellets. A convenient form in which the catalysts may be employed is as granules of about 20–100 mesh/inch size range.

The charging stock to the present polymerization process preferably comprises essentially ethylene. The ethylene charging stocks may contain inert hydrocarbons, as in refinery gas streams, for example, methane, ethane, propane, etc. However, it is preferred to employ as pure and concentrated ethylene charging stocks as it is possible to obtain. When the charging stock contains propylene as well as ethylene, both these olefins may contribute to the production of resinous high molecular weight products. The molar ratio of ethylene to propylene may be varied over the range of about 0.1 to about 20. The charging stock may contain other components such as sulfur dioxide, carbon monoxide, small amounts of hydrogen, etc., and it may contain other polymerizable materials such as butylene, acetylene, t-butylethylene, isoprene, etc.

It is desirable to minimize or avoid the introduction of oxygen, carbon dioxide, water or organic sulfur compounds into contact with the catalyst.

In general, polymerization can be effected in the present process at temperatures between about 100° C. and about 350° C. Increasing the polymerization temperature tends to reduce the average molecular weight and density of the polymer produced by the process. Usually polymerization is effected in the present process at temperatures between about 200° C. and about 300° C. or the preferred narrower range of about 230° C. to about 280° C. The conjoint use of polymerization temperatures between about 200° C. and about 300° C. and a liquid hydrocarbon reaction medium such as benzene, toluene, xylenes, decalin or methyl decalins is highly desirable in producing ethylene polymers having specific viscosities ($\times 10^5$) ranging on the average from about 10,000 to about 30,000 in continuous operations.

The process of the present invention can be effected even at atmospheric pressure, although it is usually conducted at pressures of 200 p. s. i. g. or more. The upper limit of polymerization pressure is dictated by economic considerations and equipment limitations and may be 10,000 p. s. i. g., 20,000 p. s. i. g., or even more. A generally useful and economically desirable polymerization pressure range is between about 500 and about 5000 p. s. i. g., preferably between about 500 and about 2000, p. s. i. g., e. g. about 1000 p. s. i. g.

The contact time or space velocity employed in the polymerization process will be selected with reference to the other process variables, catalysts, the specific type of product desired and the extent of ethylene conversion desired in any given run or pass over the catalyst. In general, this variable is readily adjustable to obtain the desired results. In operations in which the ethylene charging stock is caused to flow continuously into and out of contact with the solid catalyst, suitable liquid hourly space velocities are usually selected between about .1 and about 10 volumes, preferably about .5 to 5 or about 2 volumes of ethylene solution in a liquid reaction medium, which is usually an aromatic hydrocarbon such as benzene, toluene, xylenes, or tetralin, or a cycloaliphatic hydrocarbon, such as decalin (decahydronaphthalene). The amount of ethylene in such solutions may be in the range of about 2 to 50% by weight, preferably about 2 to about 10 weight percent or, for example, about 5 to 10 weight percent. When the ethylene concentration in the liquid reaction medium is decreased below about 2 weight percent, the molecular weight and melt viscosity of the polymeric products drop sharply. The rate of ethylene polymerization tends to increase with increasing concentration of the ethylene in the liquid reaction medium. However, the rate of ethylene polymerization to form high molecular weight, normally solid polymers should not be such as to yield said solid polymers in quantities which substantially exceed the solubility thereof in said liquid reaction medium under the reaction conditions, usually up to about 5–7 weight percent, exclusive of the amounts of polymeric products which are selectively adsorbed by the catalyst. Although ethylene concentrations above 10 weight percent in the liquid reaction medium may be used, solutions of ethylene polymer above 5–10% in the reaction medium become very viscous and difficult to handle and severe cracking or spalling of the solid metal oxide catalyst particles or fragments usually may occur, resulting in catalyst carry-over as fines with the solution of polymerization products and extensive loss of catalyst from the reactor.

In batch operations, operating periods of between about one-half and about 10 hours, usually between about 1 and about 4 hours, are employed and the reaction autoclave is charged with additional ethylene as the pressure falls as a result of the ethylene conversion reaction.

The solvent:catalyst weight ratio can be varied in the range of about 5 to about 3000, or even higher for continuous reaction systems. The employment of high solvent:catalyst ratios, which is rendered possible by the presence of calcium carbide in the reaction zone, is very important in preventing fouling of the catalyst by resinous reaction products.

Ethylene may be polymerized in the gas phase and in the absence of a liquid reaction medium by contact with calcium carbide (or the like carbides) and group 6a metal oxide catalysts. Upon completion of the desired polymerization reaction it is then possible to treat the solid catalyst for the recovery of the solid polymerization products, for example by extraction with suitable solvents. However, in the interests of obtaining increased rates of ethylene conversion and of continuously removing solid conversion products from the catalyst, it is desirable to effect the conversion of ethylene in the presence of suitable liquid reaction media. The liquid reaction medium may also be employed as a means of contacting the ethylene with catalyst by preparing a solution of ethylene in the liquid reaction medium and contacting the resultant solution with the polymerization catalyst.

The liquid reaction medium functions as a solvent to remove some of the normally solid product from the catalyst surface.

Various classes of hydrocarbons or their mixtures which are liquid and substantially inert under the polymerization reaction conditions of the present process can be employed. Members of the aromatic hydrocarbon series, particularly the mononuclear aromatic hydrocarbons, viz., benzene, toluene, xylenes, mesitylene and xylene-p-cymene mixtures can be employed. Tetrahydronaphthalene can also be employed. In addition, I may employ such aromatic hydrocarbons as ethylbenzene, isopropylbenzene, n-propylbenzene, sec-butylbenzene, t-butylbenzene, ethyltoluene, ethylxylenes, hemimellitene, pseudocumene, prehnitene, isodurene, diethylbenzenes, isoamylbenzene and the like. Suitable aromatic hydrocarbon fractions can be obtained by the selective extraction of aromatic naphthas, from hydroforming operations as distillates or bottoms, from cycle stock fractions of cracking operations, etc.

I may also employ certain alkyl naphthalenes which are liquid under the polymerization reaction conditions, for example, 1-methylnaphthalene, 2-isopropylnaphthalene, 1-n-amylnaphthalene and the like, or commercially produced fractions containing these hydrocarbons.

Certain classes of aliphatic hydrocarbons can also be employed as a liquid hydrocarbon reaction medium in the present process. Thus, I may employ various saturated hydrocarbons (alkanes and cycloalkanes) which are liquid under the polymerization reaction conditions and which do not crack substantially under the reaction conditions. Either pure alkanes or cycloalkanes or commercially available mixtures, freed of catalyst poisons, may be employed. For example, I may employ straight run naphthas or kerosenes containing alkanes and cycloalkanes. Specifically, I may employ liquid or liquefied alkanes such as n-pentane, n-hexane, 2,3-dimethylbutane, n-octane, iso-octane (2,2,4-trimethylpentane), n-decane, n-dodecane, cyclohexane, methylcyclohexane, dimethylcyclopentane, ethylcyclohexane, decalin, methyldecalins, dimethyldecalins and the like.

I may also employ a liquid hydrocarbon reaction medium comprising liquid olefins, e. g., n-hexenes, cyclohexene, 1-octene, hexadecenes and the like.

The normally solid polymerization products which are retained on the catalyst surface or grease-like ethylene polymers may themselves function to some extent as a liquefied hydrocarbon reaction medium, but it is highly desirable to add a viscosity reducing hydrocarbon, such as those mentioned above, thereto in the reaction zone.

The liquid hydrocarbon reaction medium should be freed of poisons before use in the present invention by acid treatment, e. g., with anhydrous p-toluenesulfonic acid, sulfuric acid, phosphoric acid or by equivalent treatments, for example with aluminum halides or other Friedel-Crafts catalysts, maleic anhydride, calcium, calcium hydride, sodium or other alkali metals, alkali metal hydrides, lithium aluminum hydride, hydrogen and hydrogenation catalysts (hydrofining), filtration through a column of copper grains or 8th group metal, etc., or by combinations of such treatments.

C. P. xylenes can be purified by refluxing with a mixture of $MoO_3$—$Al_2O_3$ catalyst and $LiAlH_4$ (50 cc. xylene—1 g. catalyst—0.2 g. $LiAlH_4$) at atmospheric pressure, followed by distillation of the xylenes. Still more effective purification of solvent can be achieved by heating it to about 225–250° C. with either sodium and hydrogen or NaH in a pressure vessel.

Temperature control during the course of the ethylene conversion process can be readily accomplished owing to the presence in the reaction zone of a large liquid mass having relatively high heat capacity. The liquid hydrocarbon reaction medium can be cooled by indirect heat exchange inside or outside the reaction zone.

When solvents such as xylenes are employed, some alkylation thereof by ethylene can occur under the reaction conditions. Propylene is a far more reactive alkylating agent than ethylene and when propylene is present in the feed it is desirable to employ a non-alkylatable solvent such as decalin. The alkylate is removed with grease in the present process, can be separated therefrom by fractional distillation and can, if desired, be returned to the polymerization zone.

The process of this invention can be carried out in conventional equipment, e. g., in pressure vessels provided with agitators to effect contacting of the catalyst and carbide with the liquid reaction medium and ethylene. For vapor phase operation, fixed or fluidized beds of pelleted or powdered catalyst, respectively, in reaction towers of conventional design can be used.

The solution of solid polyethylenes or interpolymer of ethylene with a comonomer can be recovered by cooling said solution to temperatures between about 0° C. and 90° C., most often about 20–30° C. and filtering the precipitated polymer. Precipitation of the solid polymer from solution can also be induced by addition of antisolvents, e. g., alcohols, ketones, etc.

Alternatively, the solution of solid polymer can be mixed with hot water and superheated steam to effect rapid vaporization of the solvent from the solid polymer. The aqueous slurry of polymer can be concentrated by conventional methods to yield a slurry containing about 10 to 15 weight percent polymer, which can thereafter be centrifuged to yield a polymer containing a minor proportion of water, and can then be thoroughly dried in conventional equipment.

The following examples are intended to illustrate but not to limit my invention.

The examples were carried out in a 100 ml. autoclave provided with a magnetically-actuated stirrup-type stirrer which was reciprocated through the liquid reaction medium, maintaining the catalyst and carbide promoter in suspension. In each example (except No. 5), an 8 weight percent molybdena on gamma-alumina catalyst was employed, pre-reduced before use with a stream of dry hydrogen at atmospheric pressure and 480° C., said hydrogen passing at the rate of about 5 liters per hour over 1 to 5 grams of catalyst for a total of 16 hours. Purified xylene was employed as the liquid reaction medium in Examples 1–4. The ethylene charging stock was a commercial product which had been dehydrated over anhydrous calcium sulfate and decarbonated by contact with sodium hydroxide-asbestos.

The important effects of the carbide promoters will be appreciated by bearing the following information in mind. In a run employing the same operating procedure as the examples, using the same catalyst and solvent, 0.5 g. of solid ethylene polymer per g. of molybdena-alumina catalyst was obtained at 230° C. and ethylene partial pressure of 1000 p. s. i. g., the reaction having been continued until no further quantities of ethylene could be absorbed in the reaction mixture.

*Example 1*

The autoclave was charged with 1 g. of the pre-reduced molybdena-alumina catalyst (20–85 mesh powder), 1 g. of commercial calcium carbide, 50 cc. of purified xylenes, the air was displaced with hydrogen and the contents of the reactor were heated to 254° C., following which ethylene was injected to an intial pressure of 845 p. s. i. g. Ethylene was repressured into the autoclave from time to time to maintain the initial pressure. The total reaction period was 21 hours. Following reaction, the autoclave was allowed to cool to room temperature, gas was bled off to atmospheric pressure, the autoclave was opened and the contents were carefully mixed with water. A mixture of the catalyst and the polymer wet with xylenes solvent was transferred to a filter and washed down with xylenes at room temperature. The precipitate was then continuously extracted with boiling xylenes to extract the solid polymer from the catalyst. Upon completion of extraction the hot solution of solid polymer in xylenes was poured into an equal volume of acetone to precipitate the solid polymer. This procedure yielded 4.2 g. of a tough, white, solid ethylene polymer which was formed into a tough and flexible film. The specific viscosity of the polymer was 17,700, the melt viscosity was $5 \times 10^5$ poises and the density at 24° C. was 0.964. The first filtrate produced in the polymer work-up process contained small proportions of grease-like ethylene polymers and some alkylated xylenes.

*Example 2*

The autoclave was charged with 1 g. of the pre-reduced molybdena-alumina catalyst (20–80 mesh powder), 3 g. of crushed commercial calcium carbide and 50 cc. of purified xylenes. The methods of effecting reaction and product work-up were the same as in Example 1. Reaction was effected at 255° C. and ethylene partial pressure of 880 p. s. i. g. for 280 minutes. The reaction yielded 3.82 grams of a white, tough ethylene polymer which was formed into a tough and flexible film, together with small proportions of grease-like ethylene polymer and alkylated xylenes. The solid ethylene polymer had a melt viscosity of $7.4 \times 10^6$ poises and density at 24° C. of 0.962.

*Example 3*

The procedure of Example 1 is repeated but barium carbide is substituted for the calcium carbide. The work-up of reaction products to obtain the solid ethylene polymer is carried out as in Example 1.

*Example 4*

Strontium carbide is substituted for calcium carbide in the procedure of Example 1 to produce a solid ethylene polymer.

*Example 5*

The reactor was charged with 1 g. of 8 weight percent molybdena supported on gamma-alumina which had been calcined but not pre-reduced, 2.0 g. of calcium carbide and 50 cc. of purified toluene and heated with stirring to 300° C. Ethylene was then injected into the reactor to a partial pressure of 375 p. s. i. g. The total ethylene pressure drop over 21 hours was 565 p. s. i. g., resulting in the production of 1.37 g. of solid ethylene polymer per g. of the supported molybdena catalyst.

I may employ group 5a metal oxide catalysts in lieu of the group 6a metal oxides in the present process, viz. oxides of vanadium, columbium and tantalum, the process remaining otherwise unchanged in all essential regards.

The polymers produced by the process of this invention can be subjected to such after-treatment as may be desired, to fit them for particular uses or to impart desired properties. Thus, the polymers can be extruded, mechanically milled, filmed or cast or converted to sponges or latices. Antioxidants, stabilizers, fillers, extenders, plasticizers, pigments, insecticides, fungicides, etc. can be incorporated in the polyethylene or ethylene copolymers and/or in by-product alkylates or "greases." The polyethylenes may be employed as coating materials, binders, etc. to an even wider extent than polyethylenes made by prior processes.

The polymers produced by the process of the present invention, especially the polymers having high specific viscosities, can be blended with the lower molecular weight polyethylenes to impart stiffness or flexibility or other desired properties thereto. The solid resinous products produced by the process of the present invention can, likewise, be blended in any desired proportions with hydrocarbon oils, waxes such as paraffin or petrolatum waxes, with ester waxes, with high molecular weight polybutylenes, and with other organic materials. Small proportions between about .01 and about 1 percent of certain of the various polymers of ethylene produced by the process of the present invention can be dissolved or dispersed in hydrocarbon lubricating oils to increase V. I. and to decrease oil consumption when the compounded oils are employed in motors; larger amounts of polyethylenes may be compounded with oils of various kinds and for various purposes.

The products having a molecular weight of 50,000 or more produced by the present invention, can be employed in small proportions to substantially increase the viscosity of fluent liquid hydrocarbon oils and as gelling agents for such oils. The solution of about 1 gram of an ethylene polymer produced by this invention, having a specific viscosity $\times 10^5$ of about 50,000 in about one liter of xylenes at a temperature close to the boiling point produces an extremely viscous solution.

The polymers produced by the present process can be subjected to chemical modifying treatments, such as halogenation, halogenation followed by dehalogenation, sulfohalogenation, e. g., by treatment with sulfuryl chloride, sulfonation, and other reactions to which hydrocarbons may be subjected.

Having thus described my invention, what I claim is:

1. In a polymerization process, the steps which comprise contacting ethylene with a carbide of a metal selected from the group consisting of calcium, strontium and barium and a catalyst comprising essentially an oxide of a metal of group 6a of the Mendeleef Periodic Table at a reaction temperature between about 100° C. and about 350° C., and separating a polymer having a molecular weight of at least about 300 thus produced.

2. The process of claim 1 wherein said oxide is partially prereduced before use.

3. In a process for the production of a normally solid hydrocarbon material, the steps which comprise contacting ethylene with a carbide of a metal selected from the group consisting of calcium, strontium and barium and a catalyst comprising essentially an oxide of a metal of group 6a of the Mendeleef Periodic Table in the presence of a liquid hydrocarbon reaction medium at a reaction temperature between about 100° C. and about 350° C., and separating a normally solid hydrocarbon material thus produced.

4. The process of claim 3 wherein said oxide is partially prereduced before use.

5. The process of claim 3 wherein said liquid hydrocarbon reaction medium is a saturated hydrocarbon.

6. The process of claim 3 wherein said liquid hydrocarbon reaction medium is a monocyclic aromatic hydrocarbon.

7. In a process for the production of a normally solid, resinous hydrocarbon material, the steps which comprise contacting ethylene in a liquid hydrocarbon reaction medium with calcium carbide and a catalyst comprising essentially an oxide of a metal of group 6a of the Mendeleef Periodic Table at a reaction temperature between about 200° C. and about 300° C. and a reaction pressure of at least about 200 p. s. i. g., and separating a normally solid, resinous hydrocarbon material thus produced.

8. The process of claim 7 wherein said catalyst comprises essentially molybdena carried upon a difficultly reducible metal oxide support, the molybdenum in said molybdena having a positive valence between about 2 and about 5.5.

9. In a process for the production of a normally solid, resinous hydrocarbon material, the steps which comprise contacting ethylene in a concentration between about 2 and about 10 weight percent in a liquid hydrocarbon reaction medium with a carbide of a metal selected from the group consisting of calcium, strontium and barium and a catalyst comprising essentially a minor proportion of an oxide of a metal of group 6a of the Mendeleef Periodic Table supported upon a major proportion of a difficultly reducible metal oxide, at a reaction temperature between about 200° C. and about 300° C. and a reaction pressure between about 200 and about 5000 p. s. i. g., and separating a normally solid, resinous hydrocarbon material thus produced.

10. The process of claim 9 wherein the carbide is calcium carbide, the liquid reaction medium is an aromatic hydrocarbon, the catalyst comprises essentially molybdena wherein molybdenum has a positive valence between about 2 and about 5.5 and the ratio of calcium carbide to said catalyst is between about 0.1 and about 10.

11. The process of claim 10 wherein the difficulty reducible metal oxide is gamma-alumina.

12. In a process for the production of a normally solid hydrocarbon material, the steps which comprise contacting ethylene with a carbide of a metal selected from the group consisting of calcium, strontium and barium and a catalyst comprising essentially an oxide of molybdenum in the presence of a liquid hydrocarbon reaction medium at a reaction temperature between about 100° C. and about 350° C., and separating a normally solid hydrocarbon material thus produced.

13. The process of claim 12 wherein said oxide is partially reduced before use.

14. The process of claim 12 wherein said liquid hydrocarbon reaction medium is a saturated hydrocarbon.

15. The process of claim 12 wherein said liquid hydrocarbon reaction medium is a monocyclic aromatic hydrocarbon.

16. The process of claim 12 wherein said molybdenum oxide is supported upon a major proportion of a difficultly reducible metal oxide.

17. The process of claim 16 wherein said difficultly reducible metal oxide is gamma-alumina.

18. The process of claim 12 wherein the metal carbide is calcium carbide.

19. The process of claim 12 wherein the metal carbide is barium carbide.

20. The process of claim 12 wherein the metal carbide is strontium carbide.

21. The process of claim 12 wherein said molybdenum oxide is supported upon a major proportion of a difficultly reducible metal oxide, the metal carbide is calcium carbide and the weight ratio of said calcium carbide to the molybdenum oxide catalyst is between about 0.5 and about 5.

22. In a polymerization process, the steps which comprise contacting ethylene with a carbide of a metal selected from the group consisting of calcium, strontium and barium and a catalyst comprising essentially an oxide of molybdenum at a reaction temperature between about 100° C. and about 350° C., and separating a polymer having molecular weight of at least about 300 thus produced.

References Cited in the file of this patent

UNITED STATES PATENTS 2,385,609     Clark  ---------------- Sept. 25, 1945